United States Patent

Kohlndorfer et al.

[11] Patent Number: 5,799,894
[45] Date of Patent: Sep. 1, 1998

[54] SEAT BELT SYSTEM

[75] Inventors: Kenneth H. Kohlndorfer, Roseville, Mich.; Mark F. Gray, New Market, Canada; Richard W. Koning, Yale, Mich.

[73] Assignee: TRW Vehicle Safety Systems Inc., Lyndhurst, Ohio

[21] Appl. No.: 528,795

[22] Filed: Sep. 15, 1995

[51] Int. Cl.$^6$ ............... B60R 22/38; B60R 22/36
[52] U.S. Cl. ................ 242/382.4; 280/806
[58] Field of Search ............ 242/382.4, 382.1; 297/476; 280/806, 807

[56] References Cited

U.S. PATENT DOCUMENTS

| | | | |
|---|---|---|---|
| 3,620,569 | 11/1971 | Mathis | 297/388 |
| 4,726,539 | 2/1988 | Schmidt et al. | 242/382.4 X |
| 4,729,524 | 3/1988 | Befort et al. | 242/382.4 |
| 4,749,142 | 6/1988 | Saitow | 242/382.4 X |
| 4,915,321 | 4/1990 | Asfour | 242/382.2 |
| 5,061,012 | 10/1991 | Parker et al. | 297/467 |
| 5,080,299 | 1/1992 | Gray et al. | 242/382.2 |
| 5,257,754 | 11/1993 | Hishon | 242/382.2 |
| 5,328,120 | 7/1994 | Schmid | 242/382.4 |
| 5,367,917 | 11/1994 | Hishon et al. | 74/531 |

*Primary Examiner*—John Q. Nguyen
*Attorney, Agent, or Firm*—Tarolli, Sundheim, Covell, Tummino & Szabo

[57] ABSTRACT

A seat belt system (10) includes a retractor (18) with a spool (60), sections (26,28) of seat belt webbing (16) which define first and second shoulder belts (42,48), and a section (22) of seat belt webbing (16) which connects the shoulder belts (42,48) to the spool (60). The spool (60) is supported for unwinding rotation upon extraction of either of the shoulder belts (42,48), and for winding rotation upon retraction of either of the shoulder belts (42,48). A locking pawl (80) has a locking position blocking unwinding rotation of the spool (60). A cinch mechanism (100) moves the locking pawl (80) to the locking position in response to a predetermined amount of rotation of the spool (60). The predetermined amount of rotation includes a predetermined amount of unwinding rotation upon extraction of the first shoulder belt (42), a predetermined amount of winding rotation upon subsequent retraction of the first shoulder belt (42), and a predetermined amount of additional unwinding rotation upon extraction of the second shoulder belt (48) following retraction of the first shoulder belt (42).

2 Claims, 7 Drawing Sheets

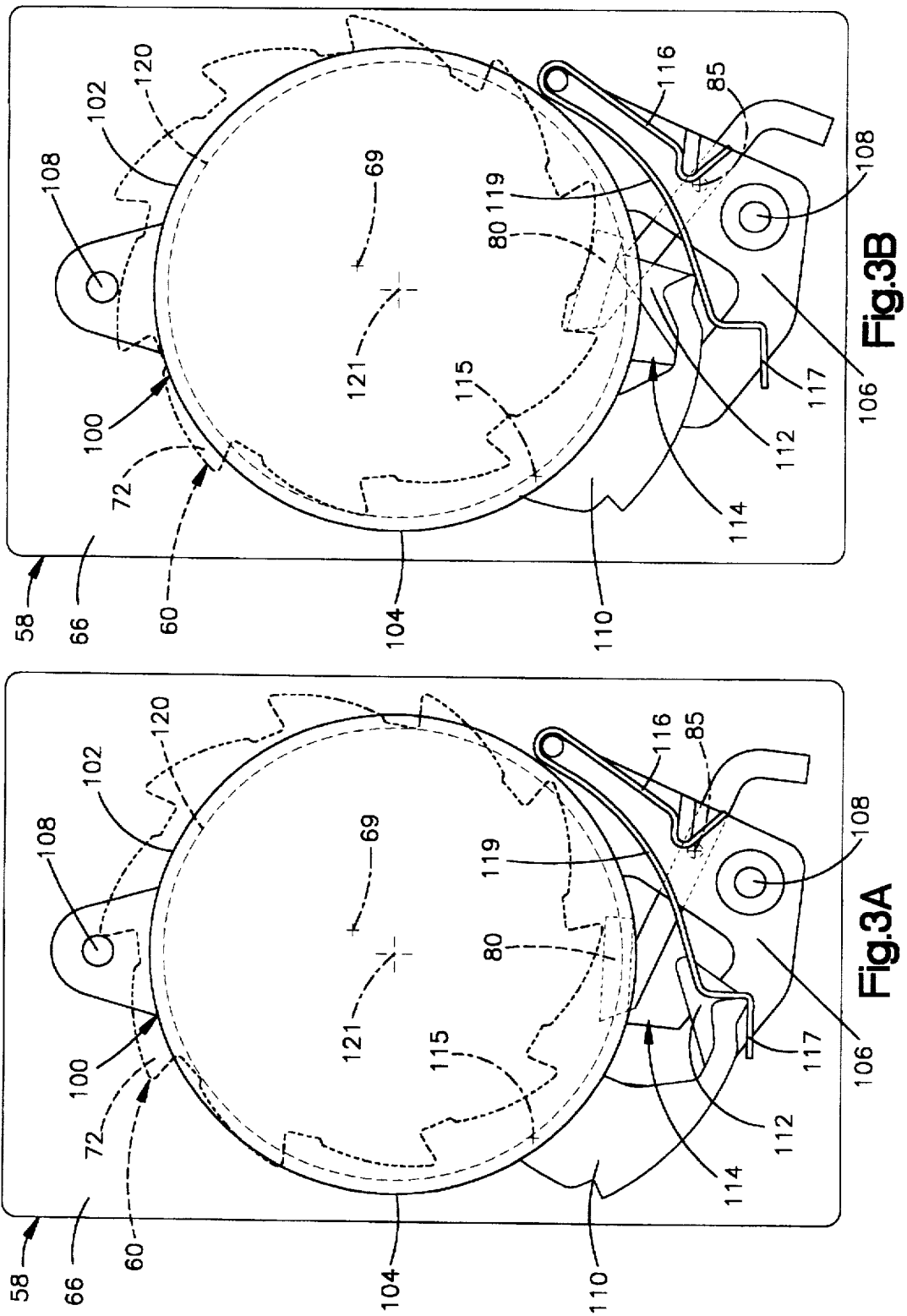

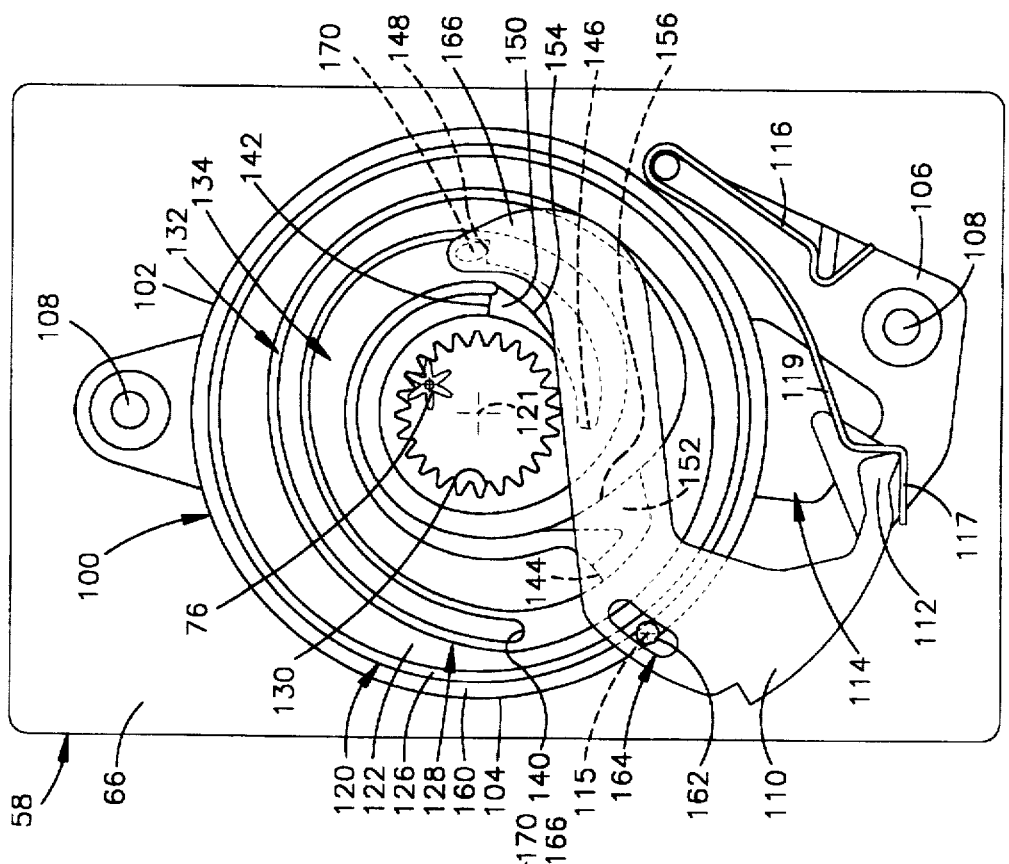
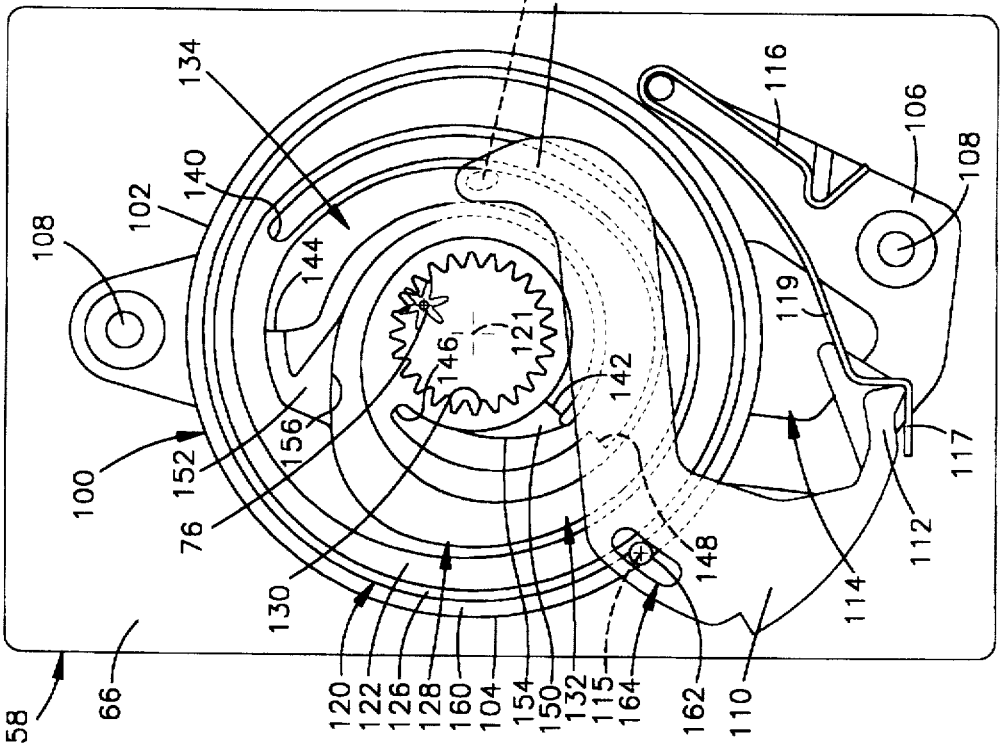

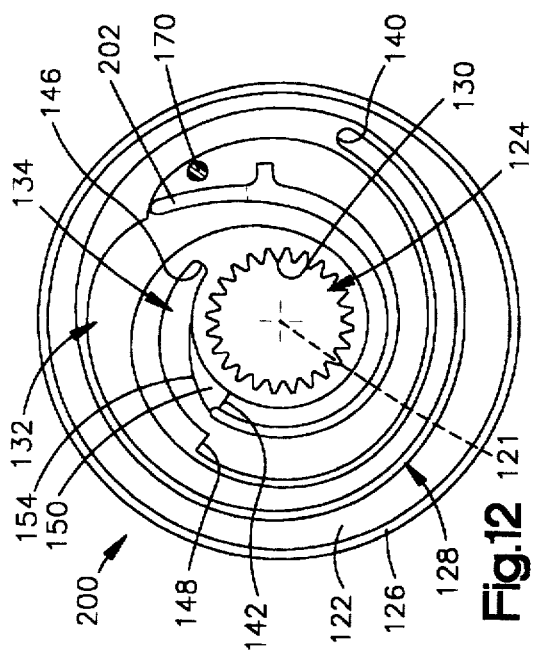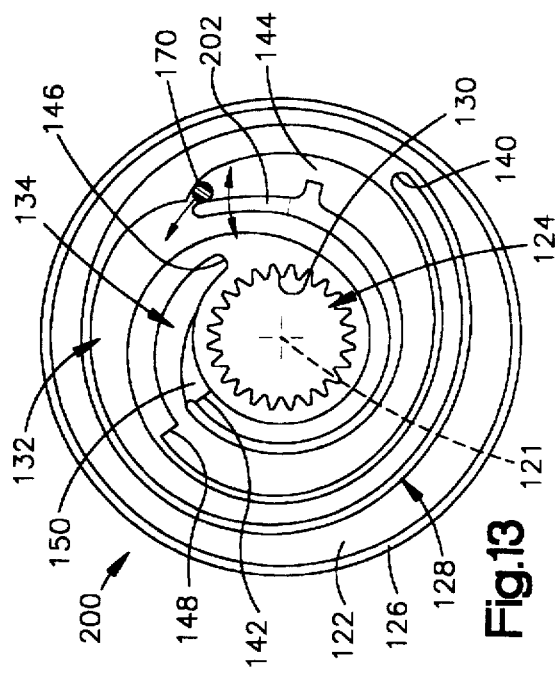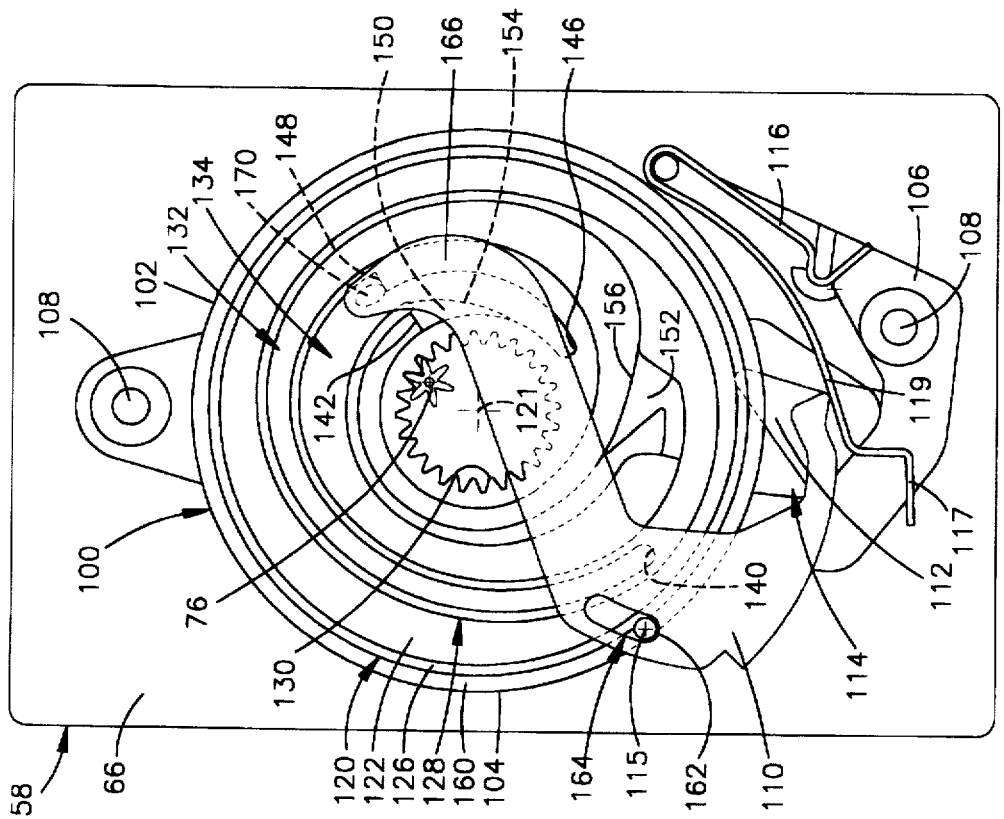

5,799,894

1

SEAT BELT SYSTEM

FIELD OF THE INVENTION

The present invention relates to a seat belt system for restraining an occupant of a vehicle, and particularly relates to a seat belt system including a retractor in which seat belt webbing is wound on a spool.

BACKGROUND OF THE INVENTION

A seat belt system for restraining an occupant of a vehicle ordinarily includes seat belt webbing, a seat belt buckle, and a seat belt retractor. A locking tongue is connected to the webbing and is releasably lockable in the buckle when the webbing is extended around the vehicle occupant. The retractor includes a spool upon which the webbing is wound. The spool rotates in an unwinding direction when the vehicle occupant extracts the webbing from the retractor and moves the webbing toward the extended position in which the tongue is locked in the buckle. When the tongue is subsequently unlocked and released from the buckle, a rewind spring in the retractor rotates the spool in a winding direction to retract the webbing into the retractor.

When the vehicle experiences a collision, the vehicle decelerates and the vehicle occupant wearing the seat belt webbing moves suddenly against the webbing. This urges the webbing to move outward from the retractor. Therefore, a retractor in a seat belt system ordinarily includes an emergency locking mechanism which blocks rotation of the spool in the unwinding direction upon the occurrence of vehicle deceleration indicative of a collision. The emergency locking mechanism thus prevents the webbing from being extracted from the retractor when the vehicle experiences a collision.

It is sometimes desirable to prevent the webbing from being extracted from the retractor throughout the time that the webbing is secured around the vehicle occupant, i.e., to maintain the webbing in a cinched condition. For example, it is often desirable to maintain the webbing in a cinched condition in a child seat belt system.

SUMMARY OF THE INVENTION

In accordance with the present invention, a seat belt system for restraining an occupant of a vehicle comprises a spool and seat belt webbing. The seat belt webbing includes a pair of shoulder belts and means for connecting the shoulder belts to the spool. The spool is supported for unwinding rotation upon extraction of either of the shoulder belts, and for winding rotation upon retraction of either of the shoulder belts.

A lock means blocks unwinding rotation of the spool when the lock means is actuated. A cinch means actuates the lock means in response to a predetermined amount of rotation of the spool. The predetermined amount of rotation includes a predetermined amount of unwinding rotation followed by a predetermined amount of winding rotation. The predetermined amount of rotation further includes a predetermined amount of additional unwinding rotation which follows the winding rotation.

In a preferred embodiment of the present invention, the predetermined amount of unwinding rotation is an amount which occurs when one of the shoulder belts is initially extracted and moved around the vehicle occupant. The predetermined amount of winding rotation is an amount which occurs when the shoulder belt is subsequently retracted slightly upon locking of a corresponding locking tongue in a seat belt buckle. The predetermined amount of additional unwinding rotation is an amount which occurs when the other shoulder belt is similarly extracted and moved around the vehicle occupant. Accordingly, the predetermined amount of rotation of the spool indicates that the two shoulder belts have both been moved to positions extending about the vehicle occupant.

BRIEF DESCRIPTION OF THE DRAWINGS

The present invention will become apparent to those skilled in the art to which the present invention relates from reading the following description with reference to the accompanying drawings, in which:

FIG. 3A is a partially schematic view showing other parts of the seat belt system of FIG. 1 in unactuated positions;

FIG. 3B is a view showing the parts of FIG. 3A in actuated positions;

FIGS. 8, 9, 10, and 11 are views similar to FIG. 7 showing parts in positions taken successively during operation of the seat belt system of FIG. 1;

FIG. 12 is a view similar to FIG. 4 showing parts of a seat belt system comprising a second embodiment of the present invention; and FIG. 13 is a view showing the parts of FIG. 12 in different positions.

DESCRIPTION OF PREFERRED EMBODIMENTS

Figure 1:
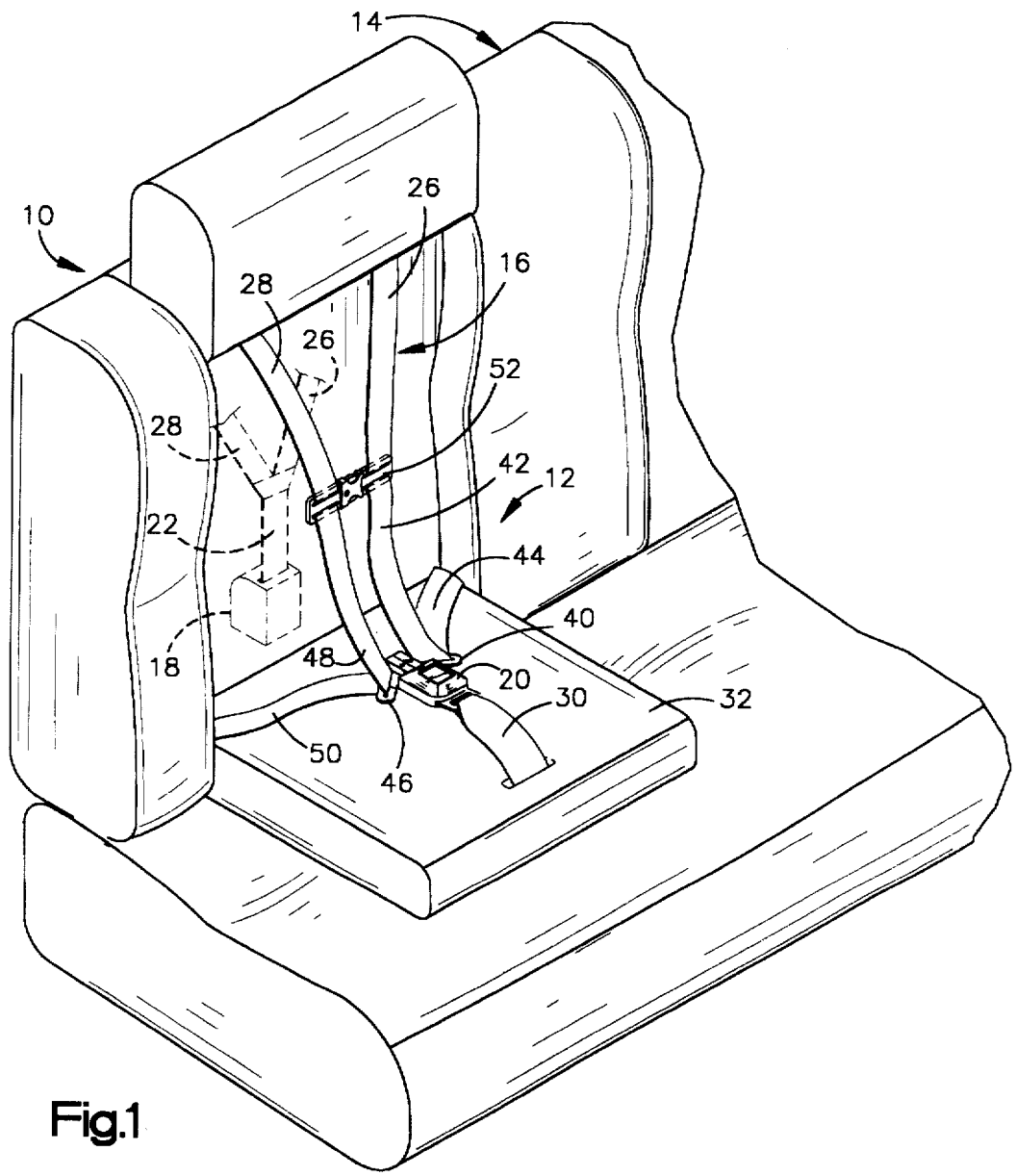
FIG. 1 is a view of a seat belt system comprising a first embodiment of the present invention.

A seat belt system 10 comprising a first embodiment of the present invention is shown in FIG. 1. By way of example, the seat belt system 10 is a child restraint system associated with a child seat portion 12 of a vehicle seat 14. The seat belt system 10 includes seat belt webbing 16, a seat belt retractor 18 at the rear of the seat 14, and a seat belt buckle 20 at the front of the seat 14.

The webbing 16 has several distinct sections. A first section 22 of the webbing 16 extends upward from the retractor 18, as shown in dashed lines in FIG. 1. The first section 22 of the webbing 16 is connected to second and third sections 26 and 28 of the webbing 16. Each of the second and third sections 26 and 28 extends upward from the first section 22 at the rear of the seat 14, through openings (not shown) in the seat 14 to the front of the seat 14, and downward over the child seat 12 to locations at which they are fixed to the seat 14. A fourth section 30 of the webbing 16 anchors the buckle 20 to a child seat panel 32.

A first locking tongue 40 is connected with the second section 26 of the webbing 16. The first tongue 40 is slidable along the length of the second section 26, and is releasably lockable in the buckle 20. When the first tongue 40 is locked in the buckle 20, it defines a shoulder belt portion 42 and a lap belt portion 44 of the second section 26 of the webbing 16.

A second locking tongue 46 is similarly connected with the third section 28 of the webbing 16. When locked in the buckle 20, the second tongue 46 defines shoulder and lap belt portions 48 and 50 of the third section 28 of the webbing 16. An adjustment member 52 is connected with the shoulder belt portions 42 and 48 of the second and third sections 26 and 28 of the webbing 16. The adjustment member 52 adjusts and locates the shoulder belt portions 42 and 48 relative to a seated child in a known manner.

Figure 2B:
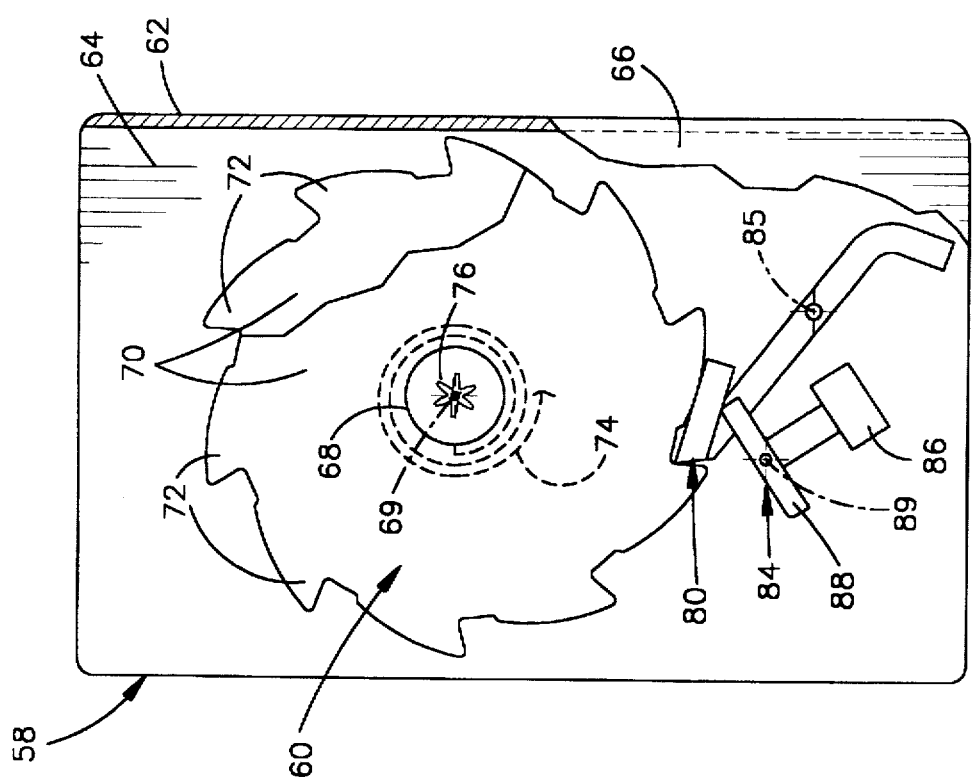
FIG. 2B is a view showing the parts of FIG. 2A in actuated positions.
Figure 2A:
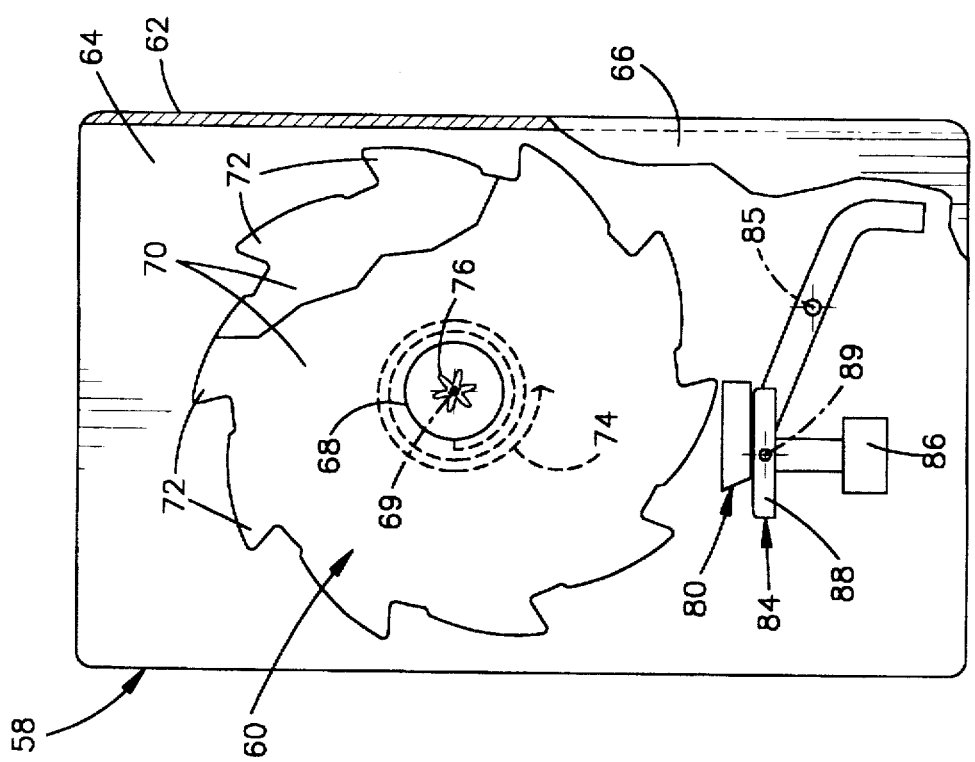
FIG. 2A is a schematic view showing parts of the seat belt system of FIG. 1 in unactuated positions.

Parts of the retractor 18 are shown in FIGS. 2A and 2B. The retractor 18 includes a frame 58 and a spool 60. The frame 58 has a rear wall 62, a first side wall 64, and a second side wall 66. The spool 60 includes a shaft 68 with a longitudinal central axis 69, and further includes a pair of ratchet wheels 70 which are spaced apart along the shaft 68. Each ratchet wheel 70 has a plurality of ratchet teeth 72. The first section 22 (FIG. 1) of the webbing 16 is connected to the shaft 68 between the ratchet wheels 70 in a known manner.

The spool 60 is supported between the side walls 64 and 66 of the frame 58 for rotation about the axis 69 in a winding direction, which is clockwise as viewed in the drawings, and in an unwinding direction, which is counterclockwise as viewed in the drawings. A rewind spring 74, which is shown schematically, is connected between the spool 60 and the frame 58. The rewind spring 74 is stressed upon rotation of the spool 60 in the unwinding direction and biases the spool 60 to rotate back in the winding direction. A pinion 76 on the end of the shaft 68 rotates equally with the spool 60.

Also shown schematically in FIGS. 2A and 2B is a locking pawl 80 and an emergency locking mechanism 84. The pawl 80 has an axis 85, and is supported between the side walls 64 and 66 of the frame 58 for pivotal movement about the axis 85 in a known manner. The pawl 80 is thus movable between a non-locking position spaced from the ratchet teeth 72, as shown in FIG. 2A, and a locking position extending into the path of movement of the ratchet teeth 72 to block rotation of the spool 60 in the unwinding direction, as shown in FIG. 2B.

The emergency locking mechanism 84 includes an inertia member 86 and a lever 88. Like the pawl 80, the inertia member 86 and the lever 88 are supported between the side walls 64 and 66 of the frame 58 for pivotal movement about an axis 89 in a known manner. When the vehicle experiences a predetermined amount of deceleration, such as occurs in a collision, the inertia member 86 and the lever 88 move pivotally about the axis 89 from the position shown in FIG. 2A to the position shown in FIG. 2B. The lever 88 simultaneously moves against the pawl 80 to move the pawl 80 from the unlocking position to the locking position. The spool 60 is thus blocked from rotating in the unwinding direction upon the occurrence of vehicle deceleration indicative of a collision. As a result, the first section 22 (FIG. 1) of the webbing 16 cannot be further unwound from the spool 60 during a collision. The webbing 16 restrains an occupant of the child seat 12 accordingly.

In addition to the emergency locking mechanism 84, the retractor 18 includes a cinch mechanism 100 (FIGS. 3A and 3B) which also operates to block unwinding rotation of the spool 60. The cinch mechanism 100 is actuated in response to a predetermined amount of rotation of the spool 60. The predetermined amount of rotation of the spool 60 is an amount which indicates that the second and third sections 26 and 28 (FIG. 1) of the webbing 16 have both been moved to the positions in which they are secured about an occupant of the child seat 12 by the tongues 40 and 46 and the buckle 20.

The cinch mechanism 100 then maintains the webbing 16 in a cinched condition throughout the time that the webbing 16 is secured about the occupant of the child seat 12.

The cinch mechanism 100 has a housing 102 with upper and lower parts 104 and 106. The housing 102 is mounted on the outside of the second side wall 66 of the frame 58 by a pair of fasteners 108. A cinch lever 110 projects outward from the upper part 104 of the housing 102. A lower end portion 112 of the cinch lever 110 projects inward through an opening 114 in the second side wall 66 of the frame 58, and is engaged with the pawl 80 between the two side walls 64 and 66 of the frame 58. As will be explained in more detail below, the cinch lever 110 is pivotal about an axis 115 between an unactuated position, as shown in FIG. 3A, and an actuated position, as shown in FIG. 3B. When the cinch lever 110 moves from the unactuated position to the actuated position, it lifts the pawl 80 into the locking position in which the pawl 80 extends into the path of movement of the ratchet teeth 72 on the spool 60.

A cinch spring 116 acts between the lower part 106 of the housing 102 and the lower end portion 112 of the cinch lever 110. When the cinch lever 110 is in the unactuated position of FIG. 3A, a lower portion 117 of the cinch spring 116 engages the cinch lever 110 and exerts a bias holding the cinch lever 110 in the unactuated position. When the cinch lever 110 is in the actuated position of FIG. 3B, an upper portion 119 of the cinch spring 116 engages the cinch lever 110 and alternately exerts a bias holding the cinch lever 110 in the actuated position.

As shown schematically in FIGS. 3A and 3B, the cinch mechanism 100 further includes a cam wheel 120 which is contained in the upper part 104 of the housing 102. The cam wheel 120 rotates about an axis 121 in response to rotation of the spool 60 about the axis 69. The axis 121 is radially offset from the axis 69. When the spool 60 completes the predetermined amount of rotation, as described briefly above, the cam wheel 120 moves the cinch lever 110 from the unactuated position to the actuated position.

Figure 4:
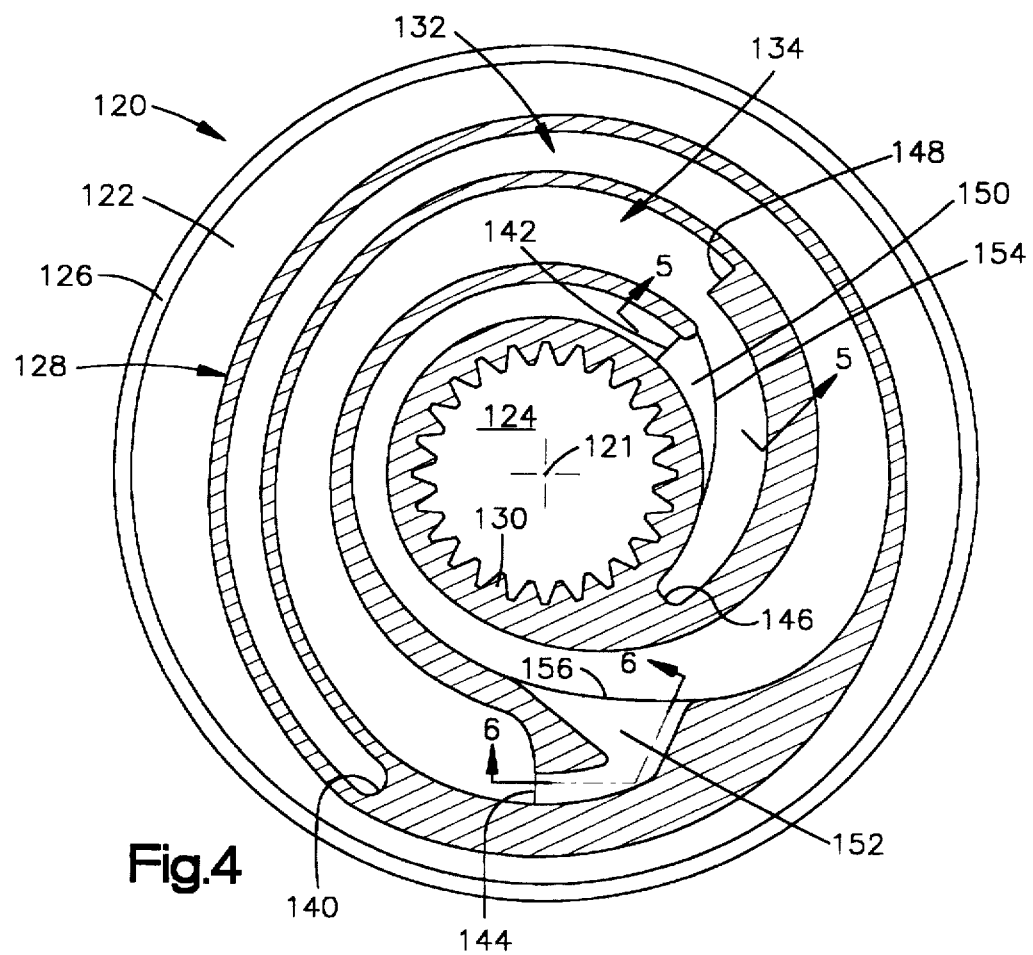
FIG. 4 is a detailed view of a part shown schematically in FIGS. 3A and 3B.

As shown in detail in FIG. 4, the cam wheel 120 is centered on the axis 121. A ring-shaped base wall 122 of the cam wheel 120 is perpendicular to the axis 121, and defines a central opening 124. A cylindrical rim wall 126 projects axially from the base wall 122 at the radially outer periphery of the base wall 122. A track wall structure 128 also projects axially from the base wall 122. The track wall structure 128 defines an internal gear 130 which surrounds the central opening 124. The track wall structure 128 further defines a pair of cam tracks 132 and 134 which surround the internal gear 130.

Each of the cam tracks 132 and 134 extends around the axis 121 along a generally spiral path. The first cam track 132 has a radially outer end 140 and a radially inner end 142. The second cam track 134 has a radially outer end 144 and a radially inner end 146. An abutment surface 148 of the track wall structure 128 is located in the second cam track 134 and extends partially across the second cam track 134.

Figure 5:
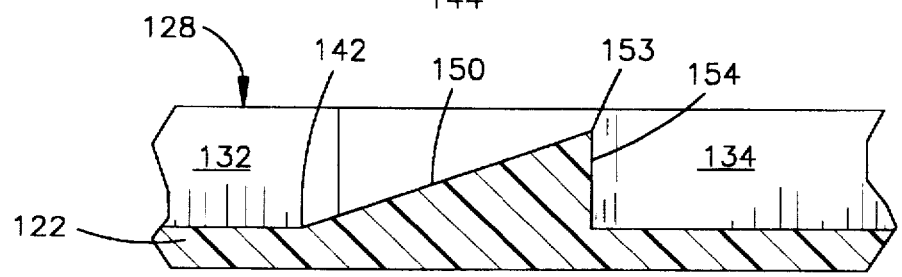
FIG. 5 is a view taken on line 5—5 of FIG. 4.

The track wall structure 128 also defines a pair of switching ramps 150 and 152, each of which extends between the two cam tracks 132 and 134. The first switching ramp 150 extends from the inner end 142 of the first cam track 132 to a location near the inner end 146 of the second cam track 134. As shown in greater detail in FIG. 5, the first switching ramp 150 slopes upward from the base wall 122 at the inner end 142 of the first cam track 132, and has an upper edge 153. A side wall 154 of the first switching ramp 150 extends vertically downward from the upper edge 153 and partially along the length of the second cam track 134.

Figure 6:
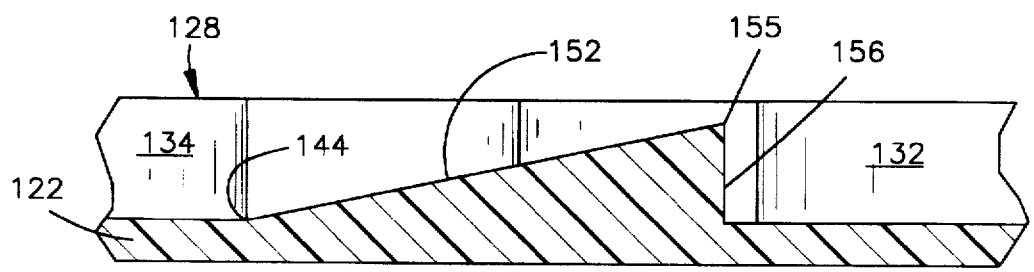
FIG. 6 is a view taken on line 6—6 of FIG. 4.

The second switching ramp 152 extends from the outer end 144 of the second cam track 134 to a location between the opposite ends 140 and 142 of the first cam track 132. As shown in greater detail in FIG. 6, the second switching ramp 152 slopes upward from the base wall 122 at the outer end 144 of the second cam track 134, and has an upper edge 155. A side wall 156 of the second switching ramp 152 extends vertically downward from the upper edge 155 and partially along the length of the first cam track 132.

Figure 7:
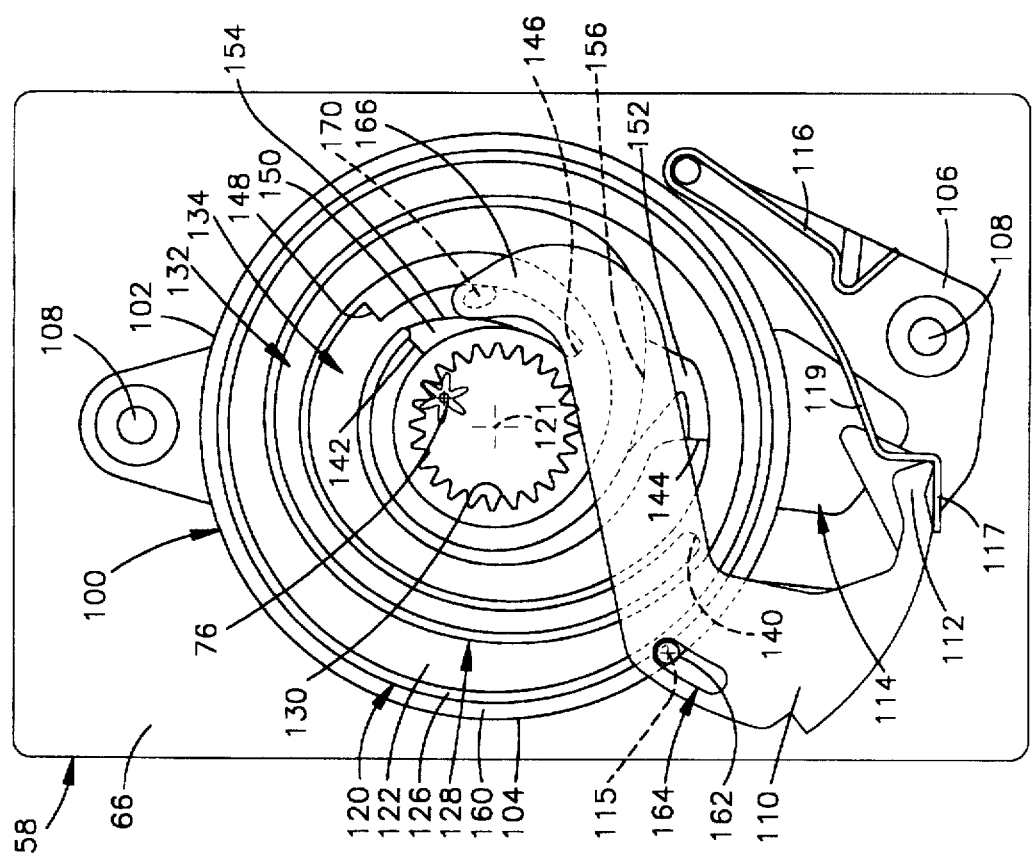
FIG. 7 is a view showing the parts of FIG. 3A in greater detail.

As shown in FIG. 7, the cam wheel 120 fits closely within a surrounding rim wall 160 of the upper part 104 of the housing 102. The rim wall 126 of the cam wheel 120 adjoins the surrounding rim wall 160 of the housing 102 in rotational sliding contact. The pinion 76 on the end of the spool shaft 68 (FIG. 2A) projects axially outward from the adjacent frame wall 66 through the central opening 124 in the cam wheel 120, and meshes with the internal gear 130. As a result, the cam wheel 120 is driven by the spool 60 to rotate about the axis 121 in the same direction, but at a slower speed, when the spool 60 rotates about the axis 69.

As described above with reference to FIGS. 3A and 3B, the cinch lever 110 is pivotal about the axis 115. As shown in FIG. 7, the axis 115 is defined by a hub 162 on the rim wall 160 of the housing 102. The hub 162 extends through an arcuate slot 164 in the cinch lever 110 so that the cinch lever 110 is also movable across the axis 115 along the length of the slot 164.

An upper end portion 166 of the cinch lever 110 supports a cam follower 170. The cam follower 170 projects axially inward from the cinch lever 110 toward the base wall 122 of the cam wheel 120, and is pressed radially against the track wall structure 128 by the bias of the cinch spring 116. When the cam wheel 120 rotates about the axis 121, the track wall structure 128 moves against the cam follower 170 to move the cinch lever 110 about and/or across the axis 115 at the hub 162.

When the first section 22 (FIG. 1) of the seat belt webbing 16 is fully retracted into the retractor 18, it is wound on the spool 60 in a maximum amount. The cinch mechanism 100 then has an unactuated condition, as shown in FIG. 7. Accordingly, the cinch lever 110 is in its unactuated position, and the pawl 80 is in its unlocking position. The cam follower 170 is then located in the first cam track 132 approximately mid-way between the opposite ends 140 and 142 of the first cam track 132.

When the second section 26 of the webbing 16 is initially moved around an occupant of the child seat 12, it is extracted relative to the retractor 18. The first section 22 of the webbing 16 is then extracted directly from the retractor 18 and is partially unwound from the spool 60. The spool 60 then experiences an initial amount of unwinding rotation which causes the cam wheel 120 to rotate from the position of FIG. 7 in the counterclockwise direction.

When the vehicle occupant has moved the second section 26 of the webbing 16 to a position approaching the buckle 20 in preparation for locking of the corresponding tongue 40 in the buckle 20, the spool 60 will have experienced at least a predetermined amount of unwinding rotation. The cam wheel 120 will have rotated in the counterclockwise direction from the position of FIG. 7 to the position of FIG. 8. Such rotation of the cam wheel 120 causes the cam follower 170 to move through the first cam track 132 relative to the cam wheel 120. The cam follower 170 is thus moved to the inner end 142 of the first cam track 132, upward (as viewed in FIG. 5) along the first switching ramp 150 to the upper edge 153 of the first switching ramp 150, and subsequently downward into the second cam track 134 adjacent to the side wall 154 of the first switching ramp 150. The slot 164 in the cinch lever 110 enables the cinch lever 110 to shift slightly on the hub 160 during such movement of the cam follower 170, but the cinch spring 116 maintains the lower end portion 112 of the cinch lever 110 substantially stationary.

A vehicle occupant will subsequently allow the second section 26 of the webbing 16 to retract slightly. This may occur immediately before and/or immediately after the occupant locks the tongue 40 in the buckle 20. The rewind spring 78 (FIG. 2A) then rotates the spool 60 a slight amount in the winding direction to retract a corresponding amount of the first section 22 of the webbing 16 into the retractor 18. As a result, the cam wheel 120 rotates in the clockwise direction from the position of FIG. 8 to the position of FIG. 9. The cam follower 170 then moves relative to the cam wheel 120 in a direction toward the outer end 144 of the second cam track 134. The cam follower 170 thus moves relatively past the abutment surface 148 in the second cam track 134.

Figure 8:
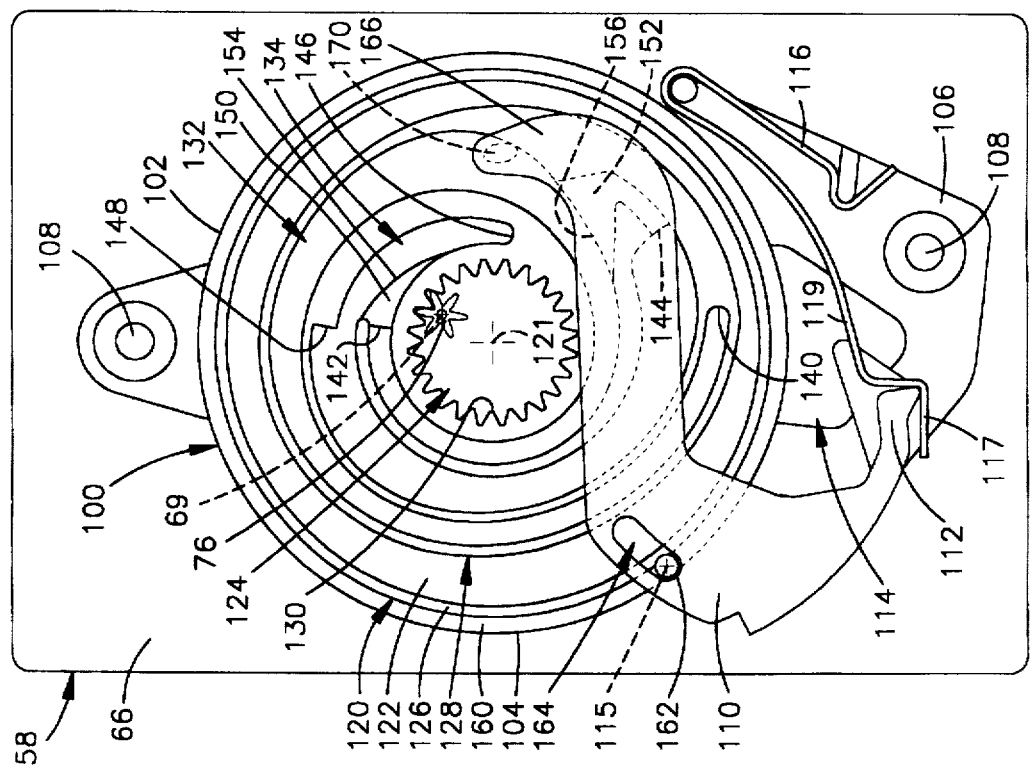

The vehicle occupant may alternatively allow the second section 26 of the webbing 16 to retract more or less than the amount that is indicated by the difference between FIGS. 8 and 9. The cam follower 170 would then move relatively through the second cam track 134 in a correspondingly greater or lesser amount. However, the winding rotation experienced by the spool 60 at this stage of operation of the cinch mechanism 100 must comprise at least an amount which is sufficient to move the cam follower 170 relatively past the abutment surface 148. The side wall 154 of the first switching ramp 150 blocks the cam follower 170 from re-entering the first cam track 132 when the cam follower 170 moves from the position of FIG. 8 toward the position of FIG. 9. This ensures that the cam follower 170 will be located in the second cam track 134 during the next stage of operation of the cinch mechanism 100 so that the cam follower 170 can interact with the abutment surface 148 in the second cam track 134.

In the next stage of operation of the cinch mechanism 100, the vehicle occupant extracts the third section 28 of the webbing 16 in preparation for locking of the corresponding tongue 46 in the buckle 20. The resulting counter clockwise rotation of the cam wheel 120 causes the abutment surface 148 in the second cam track 134 to move in the counter clockwise direction from the position of FIG. 9 to the position of FIG. 11. However, since the abutment surface 148 extends partially across the second cam track 134, it first moves into abutment with the cam follower 170 in the second cam track 134, as shown in FIG. 10, and subsequently moves the cam follower 170 from the position of FIG. 10 to the position of FIG. 11.

When the abutment surface 148 moves the cam follower 170 out of the position of FIG. 10, it pivots the cinch lever 110 about the axis 115 sufficiently to lift the lower end portion 112 of the cinch lever 110 out of engagement with the lower portion 117 of the cinch spring 116. When the abutment surface 148 moves the cam follower 170 fully to the position of FIG. 11, it pivots the cinch lever 110 fully to the actuated position. The pawl 80 is then lifted to the locking position by the cinch lever 110, and is subsequently held in the locking position by the force of the cinch spring 116 acting against the cinch lever 110.

The cinch mechanism 100 is returned from the actuated condition of FIG. 11 to the unactuated condition of FIG. 7 when the first, second, and third sections 22, 26, and 28 (FIG. 1) of the webbing 16 are fully retracted following unlocking of the tongues 40 and 46 from the buckle 20. Such retraction of the webbing 16 causes the cam wheel 120 to rotate in the clockwise direction from the position of FIG. 11 to the position of FIG. 7. The cam follower 170 is switched back from the second cam track 134 to the first cam track 132 upon moving relatively over the second switching ramp 152 in the counterclockwise direction. The side wall 156 of the second switching ramp 152 blocks the cam follower 170 from re-entering the second cam track 134 at the location of the second switching ramp 152 when the foregoing movements of the webbing 16 are repeated.

In a second embodiment of the present invention, the cinch mechanism 100 includes an alternative cinch wheel 200 (FIG. 12) in place of the cinch wheel 120 described above. The cinch wheel 200 has many parts that are substantially the same as corresponding parts of the cinch wheel 120, as indicated by the use of the same reference numbers in FIGS. 4 and 12. However, the cinch wheel 200 differs from the cinch wheel 120 in that the cinch wheel 200 has a gate 202 in place of the second switching ramp 152. The gate 202 is a flexible part of the cinch wheel 200 which is forcibly opened by the cam follower 170 to permit the cam follower 170 to move from the second cam track 134 to the first cam track 132 in the counterclockwise direction, as indicated by the arrows shown in FIG. 13. The gate 202 subsequently blocks the cam follower 170 from re-entering the second cam track 134 at that location. A similar gate could likewise be used in place of the first switching ramp 150.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:
   a spool;
   seat belt webbing including a pair of shoulder belts connected to said spool;
   means for supporting said spool for unwinding rotation upon extraction of either of said shoulder belts and for winding rotation upon retraction of either of said shoulder belts;
   means for blocking unwinding rotation of said spool when said blocking means is actuated; and
   means for actuating said blocking means in response to at least a predetermined amount of rotation of said spool;
   said predetermined amount of rotation including a predetermined amount of unwinding rotation followed by a predetermined amount of winding rotation, and further including a predetermined amount of additional unwinding rotation following said winding rotation.

2. Apparatus as defined in claim 1 wherein said predetermined amount of unwinding rotation occurs upon extraction of one of said shoulder belts, said predetermined amount of winding rotation occurring upon subsequent retraction of said one of said shoulder belts, said predetermined amount of additional unwinding rotation occurring upon extraction of the other of said shoulder belts following said retraction of said one of said shoulder belts.

* * * * *